United States Patent [19]
Regen et al.

[11] Patent Number: 5,940,537
[45] Date of Patent: Aug. 17, 1999

[54] METHOD AND SYSTEM FOR COMPENSATING FOR GEOMETRIC DISTORTION OF IMAGES

[75] Inventors: Joel H. Regen, Leander, Tex.; George Moore, Veradale, Wash.

[73] Assignee: Tamarack Storage Devices, Los Alamos, N.Mex.

[21] Appl. No.: 08/586,058

[22] Filed: Jan. 16, 1996

[51] Int. Cl.$^6$ .................................................... G06K 9/76
[52] U.S. Cl. ............................................ 382/210; 382/255
[58] Field of Search ..................................... 382/210, 211, 382/287, 254, 255, 288, 283, 282; 359/618, 629; 250/492.2

[56] References Cited

U.S. PATENT DOCUMENTS

| | | | |
|---|---|---|---|
| 4,467,211 | 8/1984 | Smith et al. | 250/492.2 |
| 5,107,351 | 4/1992 | Leib et al. | 382/210 |
| 5,172,000 | 12/1992 | Scheff et al. | 382/210 |

*Primary Examiner*—Christopher S. Kelley
*Attorney, Agent, or Firm*—Gregory M. Howison

[57] ABSTRACT

A method of and system for compensating for geometric distortion in a two-dimensional image finds fiducial marks in the image plane corresponding to fiducial marks in the object plane. The invention includes performing a matched filter search to locate corner fiducials from an object plane in the image plane. Locating the corner fiducials permits locating the remaining fiducials in the image plane. A centroid calculation makes the location of the fiducials in the image plane more precise and permits the generation of a solution matrix. The solution matrix and a trajectory engine map the pixels in the image plane to compensate for magnification, tilt, pin cushion, barrel, and other types of geometric distortions.

27 Claims, 3 Drawing Sheets

METHOD AND SYSTEM FOR COMPENSATING FOR GEOMETRIC DISTORTION OF IMAGES

TECHNICAL FIELD OF THE INVENTION

The present invention relates to the manipulation and control of electronically stored images and, more particularly, to a method and system that compensates for geometric distortion of images, such as holographic images, to overcome problems caused by lens imperfections and other system defects including pin cushion, barrel, magnification, misregistration, tilt, and offset distortions.

BACKGROUND OF THE INVENTION

Image processing technology has advanced significantly in recent years. One important area of advancement is in the processing of holographic images. The process of storing data in a holographic image or hologram involves storing a Fourier transform of a two-dimensional image of the data in an object plane on a recording medium such as a film or other device. To retrieve the stored data, the image is reconstructed by an inverse Fourier transform and captured with an electronic imager. The accuracy of the data storage and retrieval depends to a significant degree on the accuracy, from pixel to pixel, of the reconstructed image. In this process, image distortion often occurs. This distortion is primarily of a geometric form. For example, the image may be shifted or magnified or in some other way geometrically disturbed. In some other cases, the image may assume a curved distortion known as pin cushion or barrel distortion.

In an image affected by pin cushion distortion, the boundaries of a square image may be curved inwardly to the image center. For barrel distortion, the boundaries curve outwardly. The pin cushion and barrel distortions that appear in the image associate with imperfections that may exist in one or more of the lenses that reconstructs the image. These and other forms of distortion are difficult to compensate for on a pixel-by-pixel basis in the holographic image.

Other problems that arise in reconstructing holographic images include effects from misregistration, misalignment, improper magnification, image tilting, and other forms of geometric distortion. These different types of distortion prevent employing a simple recovery algorithm in which every pixel in the image corresponds to the same pixel in the object. No known method or system for accurately reconstructing the object image has acceptable image reconstruction speed or low data processing overhead to make holographic data storage a viable technology.

SUMMARY OF THE INVENTION

Therefore, a need exists for an improved method for modeling and compensating for geometric distortion in two-dimensional image such as a holographic image by which the image can be recovered at a sufficiently high speed and low processing overhead to make holographic data and image storage technology practical.

In accordance with the present invention, a method and system for modeling and compensating for geometric distortion in a two-dimensional image is provided that substantially eliminates or reduces disadvantages and problems associated with previously developed methods of compensating for geometric distortions in holographic images. The present invention finds fiducial marks in the image plane and calculates an intermediate solution matrix which will eventually compensate for effects due to magnification, tilt, pin cushion, barrel or other geometric distortions. In correcting for the geometric distortions, the present invention reconstructs the original image. This is accomplished by mathematical interpolation which compensates for the distortions in the captured image. The method models distortion between the object and image into a set of coefficients in a least squares solution. Based on the least squares solution, the method provides an accurate measurement of the desired pixel location of each point of the image that corresponds to the position of the point in the object.

A technical advantage of the present invention is that it permits recovery of large amounts of data at high speeds. One implementation of the present method uses a device called a trajectory engine for mapping distortion as a function of magnification and changes in magnification of the image with respect to the object. The present invention, in essence, uses the trajectory engine to determine the amount of local offset by which the image differs from the object.

Another technical advantage of the present invention is that it has application in systems other than holographic storage systems. For example, the present invention may be applied to many different types of lens systems for lens system alignment. This is because the present invention has the ability to quantify different types of distortion. Using the present invention, it is possible to determine how much pin cushion (or barrel) distortion effect exists in the image, as well as how much tilt and magnification there is in the image. There are higher order types of distortion that are not symmetric about the center of the image. The present invention also serves as a mechanism for quantifying these types of higher order distortions.

Another technical advantage of the present invention is that it compensates for geometric distortion in images much more economically than do prior systems. Because only a limited number of pixels are needed for the calculations, the present invention saves substantial storage space and computation time.

BRIEF DESCRIPTION OF THE DRAWINGS

For a more complete understanding of the present invention and the advantages thereof, reference is now made to the following description which is to be taken in conjunction with the accompanying drawings and in which like reference numerals indicate like features and, further, wherein.

DETAILED DESCRIPTION OF THE ILLUSTRATIVE EMBODIMENTS

The illustrative embodiments of the present invention are illustrated in the FIGUREs wherein like numerals refer to like and corresponding parts of the various drawings.

Figure 1A:
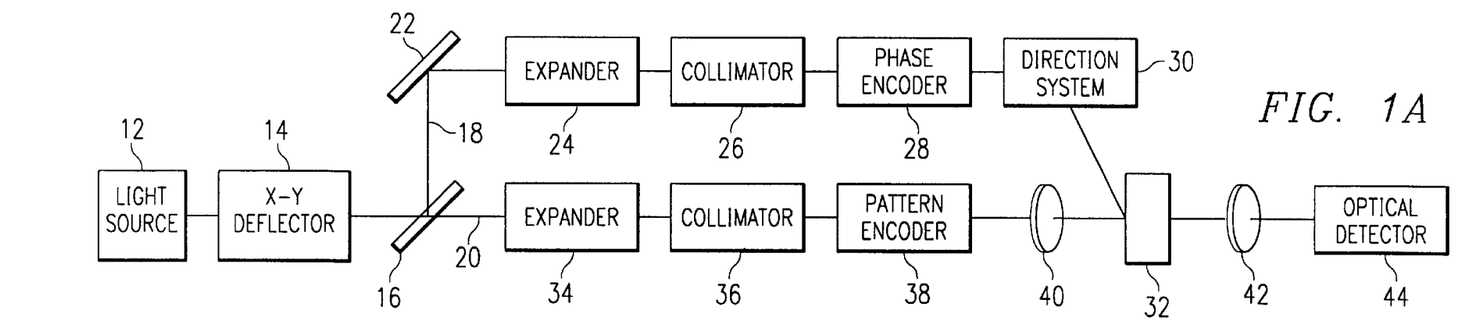
FIGS. 1A and 1B are block diagrams of a system for which the teachings of the present invention readily apply.

Although there are many processes and systems that could use the method and system of the present embodiment, FIG. 1A illustrates a particular embodiment of holographic storage system 10 which may employ the teachings of the present invention. As shown in FIG. 1A, holographic storage system 10 may be constructed using discrete optical components and, in particular, transmissive components such as lenses. Other optical systems, such as those using reflective surfaces formed on molded glass or plastic blocks may also be used.

As shown in FIG. 1A, holographic storage system 10 includes light source 12 which may include a laser light source. As will be discussed, the light from light source 12 is split into a reference beam and an object beam. The reference beam and object beam will be directed to a holographic storage medium to record and recall holographic information. Each hologram is referred to as a "page," and typically comprises an array of data bits. Several pages will be stored at one location on the holographic storage medium, referred to as a stack site. A stack site corresponds to a particular row and column on the holographic storage medium.

Light generated by light source 12 is directed to x-y deflector 14. The x-y deflector 14 moves the light up or down and left or right to address a stack site on the holographic storage medium. Light deflected by x-y deflector 14 is then split by beam splitter 16. Beam splitter 16 splits the light from light source 12 into reference beam 18 and object beam 20. Reference beam 18 is reflected by mirror 22 to expander 24. Expander 24 may be a stacked lens array and expands the light rays of object beam 18. These expanded light beams are collimated by a collimator 26. Collimator 26 collimates reference beam 18 to fill phase encoder 28. Phase encoder 28 is operable to introduce phase shifts into the wave front of reference beam 18. Phase encoder 28 may include a combination spatial light modulator ("SLM") and polarizer. In a particular example, encoder 28 may include an SLM having a 128-by-128 array of transmissive or reflective elements. Encoder 28 introduces phase shifts at each element of the array. Light from each element is then phase-shifted. The phase shifts form the phase codes used to multiplex several pages at one stack site. Light from phase encoder 28 is then directed to direction system 30. Direction system 30 focuses and directs the reference beam 18 to holographic storage medium 32.

As discussed above, beam splitter 16 also produces object beam 20. Object beam 20 is expanded by an expander 34 and collimated by collimator 36. Expander 34 may be a stacked lens array. Collimator 36 may be a collimation lens. A data pattern is imposed upon the object beam 20 by pattern encoder 38. Pattern encoder 38 may be a SLM or any device capable of encoding object beam, such as a fixed mask, or other page composer. Such pattern encoding is typically amplitude encoding. Pattern encoder 38 receives digitized data from a control system, to be discussed, and imposes that pattern onto the object beam so that the object beam comprises an array of dark and light spots. The encoded object beam is then focused by transform lens 40 to a particular stack site on holographic storage medium 32. Transform lens 40 forms the Fourier transform of the page and directs that transformed image to holographic storage medium 32. By using the Fourier transform, a smaller recording size is achieved and the system provides some immunity to material defects.

For a recall operation, object beam 20 is blocked from transmission, such as by a shutter or through the use of pattern encoder 38, for example. As reference beam 18 intersects holographic storage medium 32, the stored page is reconstructed and transmitted toward imaging optics 42, which may be an inverse Fourier transform lens. Imaging optics 42 directs and images the reconstructed object beam 20 onto optical detector 44, which in a particular example is a charge coupled device ("CCD") array. The optical detector 44 may also include a conventional photodiode array or other suitable detector array that transforms the encoded page into digitized data for use by a control system as described in association with FIG. 1B.

Figure 1B:
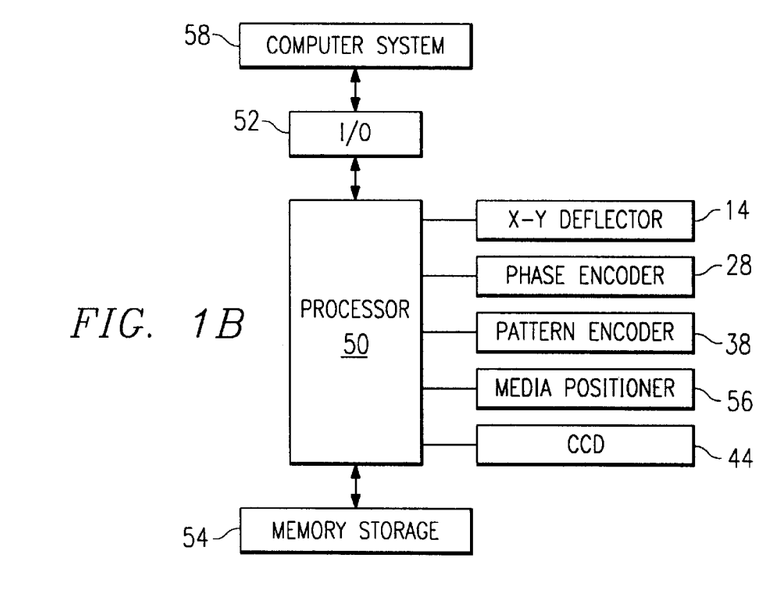

FIG. 1B illustrates a block diagram of a control system for controlling the holographic storage system 10 shown in FIG. 1. As shown in FIG. 1B, a processor 50 is coupled to I/O 52 and memory/storage 54. Processor 50 is operable to process instructions and store and retrieve data from memory/storage 54. Processor 50 may also be controlled through I/O 52. As shown in FIG. 1B, processor 50 is also coupled to pattern encoder 38, positioner 40, CCD optical detector 44, positioner 42, and to a phase encoder 28. In operation, processor 60 controls the holographic storage system 10 so as to allow recording and recall of data stored at particular stack sites. For example, holographic storage system 10 may be included as part of a larger computer system 58 as shown in FIG. 1B, and used for mass storage. Computer system 58 requests processor 50 to store data or retrieve data stored within the holographic storage medium. Processor 50, by executing instructions stored in memory/storage 54, then controls the holographic storage system 10 to perform the requested operation and accordingly responds to computer system 58 through I/O 52.

Figure 2:
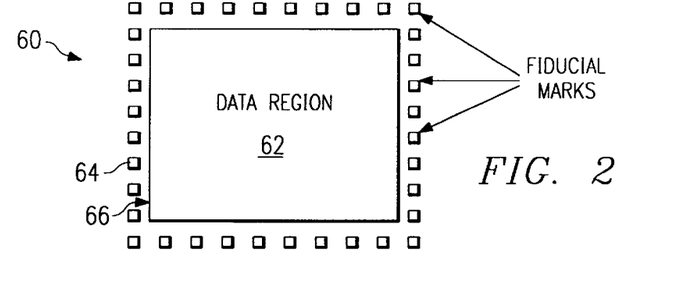
FIG. 2 illustrates fiducial placement in dedicated pixels according to one embodiment of the invention.

Having described a system in which to practice the present embodiment, the following discussion details the novel concepts of the invention as applied to holographic storage system 10. In particular, the embodiment of the present invention may be employed to accurately reconstruct the image formed by holographic storage system 10. In processor 50, for example, the present invention uses a least squares technique to model two-dimensional geometric distortion. In the object being imaged by CCD optical detector 44, there are a number of dedicated pixels whose position is always known and does not change from page to page of recording. These pixels are referred to as fiducial marks. To illustrate this concept, FIG. 2 shows object plane 60 that includes data region 62 having data that holographic storage system 10 is to record. Fiducial marks 64 surround border 66 of data region 62. The position of each fiducial mark 64 is known prior to making the hologram and is here referred to as the nominal position. Fiducial marks 64 also appear in the recorded image of object plane 60, and their position is determined using a centroid calculation which compensates for any bias in the surrounding pixels. The relationship between the nominal locations of fiducial marks 64 in object plane 60 and the location that they occupy in the image may be described by a power series in x and in y, as follows in Equation (1):

$$x = c_{x00} + c_{x10}j + c_{x01}i + c_{x20}\frac{j^2}{2} + c_{x02}\frac{i^2}{2} + \qquad (1)$$

$$c_{x11}ij + c_{x30}\frac{j^3}{6} + c_{x03}\frac{i^3}{6} + c_{x21}j^2\frac{i}{2} + c_{x12}i^2\frac{j}{2}$$

$$y = c_{y00} + c_{y10}j + c_{y01}i + c_{y20}\frac{j^2}{2} + c_{y02}\frac{i^2}{2} +$$

$$c_{y11}ij + c_{y30}\frac{j^3}{6} + c_{y03}\frac{i^3}{6} + cy_{21}j^2\frac{i}{2} + c_{x12}i^2\frac{j}{2}$$

where:
x is the x coordinate of the imaged object pixel (or "bixel," as defined below);
y is the y coordinate of the imaged object pixel (bixel);
I is the original (nominal) object pixel row (bixel row);
j is the original (nominal) object pixel column (bixel column); and $C_{x00}$, $C_{x10}$, ... are coefficients that describe the distortion for a given hologram.

Figure 3:
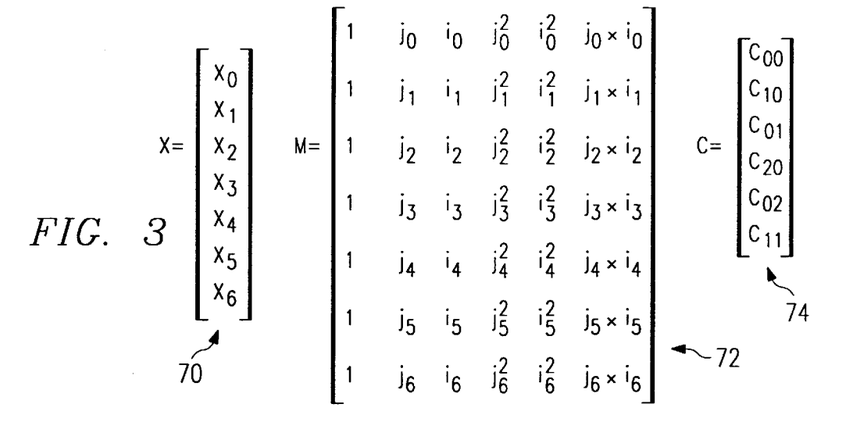
FIG. 3 describes the arrays and vectors used to develop the solution matrix of the present embodiment.

The present embodiment makes use of matrix algebra to derive a solution matrix that is a part of the distortion compensation process of the present embodiment from the nominal positions. The nominal positions for fiducial marks 64 are the i and j parameters in Equation (1). A simple matrix equation in x that derives from Equation (1) appears in Equation (2):

$$x = Mc \qquad (3)$$

where x is a column vector of floating point x coordinates of fiducial centroids in the image plane. The order of the power series is determined by the nature of the distortion. Low order engines can correct for offset, simple magnification, and rotation distortions. Higher order models are required to correct for pin cushion, barrel, and other higher order distortions. FIG. 3 shows an example of vector expansions of the variables of Equation (2) for a specific case using only five fiducial marks and six coefficients. In the FIG. 3 example, the x vector 70 contains seven elements, and the M matrix 72 is a seven row by six column matrix. The C vector 74 shows the coefficient array for the variables, c, that are coefficients. This establishes the basic relationship between the object plane and the image plane in mathematical terms. With this understanding, it is possible to more fully describe the image distortion compensation process of the present invention.

Referring more generally to both FIG. 3 and Equation (2), the general matrix M has n rows and m columns where n is the number of fiducial marks 64 in object plane 60 which will be used in the solution, and m is the number of terms in the power series expansion of Equation (1). The matrix M, therefore, has the same number of rows as there are fiducial marks 64 in object plane 60 and the image resulting from object plane 60 (see FIG. 2). It also has the same number of columns as the number of terms in Equation (1).

From Equation (2) and solving for the C vector, we have Equation (3), as follows:

$$C = M_s x \qquad (4)$$

where:

$$M_s = (M^T \cdot M)^{-1} \cdot M^T$$

For the present embodiment, the solution matrix $M_s$ is a matrix of intermediate values. It is equal to the product of (1) the inverse of the product of the transpose of matrix M multiplied by matrix M multiplied by (2) the transpose of matrix M. This transposition and multiplication step solves for systems of equations that are overconstrained (i.e., systems where there are more equations than unknowns). The solution matrix $M_s$ may be calculated prior to any observation of fiducial marks in the image plane, because it is solely based on the nominal fiducial locations ($i_n$ and $j_n$) that will be used for distortion compensation. As Equation (3) describes, the coefficients for the vector C are calculated by multiplying matrix $M_s$ by the observed fiducial coordinates in x and y.

Typically, the solution $M_s$ matrix only needs to be calculated one time to produce acceptable values for the fiducial mark 64. That is, through trial and error it is possible to determine which fiducial marks 64 are in the image that produce the best results. For example, $M_s$ may use thirty fiducial marks 64 across the top and bottom of object plane 60 and fifteen fiducial marks 64 from across the left and right border of the object plane 60. Other combinations may be preferable, depending on the particular system and image in use. Also, in some cases a fiducial mark 64 may be obscured. As a result, it may not be practical or possible to recover the centroid of that fiducial in the image and the derived $M_s$ may not be useable. In such an instance, it is often appropriate to recalculate the $M_s$ without that fiducial mark.

After obtaining $M_s$, a next step involves acquiring the image and determining fiducial locations in the image. The process begins by finding a corner fiducial mark from the object. The present embodiment uses the upper left corner fiducial mark as the first fiducial mark to find. A matched filter search technique is used to find the upper left corner fiducial mark with the entire image as the set of searched pixels. The matched filter search on the entire image, however, is used only for finding the upper left corner fiducial After finding the upper left corner fiducial, it is possible to locate corner fiducials for the other three corners of the image (i.e., the upper right, lower left, and lower right corners). The remaining corner fiducials may be found by performing a matched filter search on a smaller region. The smaller region uses the information derived from the results of the upper left corner fiducial matched filter search and forms an area in the image where the searched fiducial is likely to be found. Interpolation and other approximation techniques may be used to establish the smaller regions. This information significantly facilitates the matched filter search process. From the four corner fiducials, it is possible to estimate where all the other fiducials are by a mathematical calculation of the amount of tilt and offset in the present image. The method of selecting the closest image pixel for each object bixel is only one of a number of interpolation techniques that could be used to determine bixel value. For example there are a number of two dimensional FIR filter based interpolator techniques that employ a neighborhood of adjacent pixels to estimate bixel value.

Since these fiducial marks appear as small spots, several pixels in size, a centroid calculation in two dimensions determines the exact center location in x and y coordinates. The centroid calculation involves applying a set of weights in x and in y, multiplying those weights by the corresponding pixel values, and deriving a real number value. This value reflects the location of the center of mass or center of energy of the particular spot. This location coordinate may be based on the following centroid calculation of Equation (4) for the x coordinate:

$$C_x = \frac{\sum_{l=i-2}^{i+2} \sum_{m=j-2}^{j+2} m \cdot [R(l,m) - dc]}{\sum_l \sum_m [R(l,m) - dc]} \qquad (6)$$

where $$dc = \frac{1}{10} \cdot \sum_{l=i-2}^{i+2} [R(l, j-3) + R(l, j+3)]$$

The y coordinate of the centroid may be determined similarly. Calculating the centroid in y provides the centered energy or the center of mass of the spot in the y dimension. This produces an x vector or y vector depending on the coordinate for which Equation (4) is being solved. In the present embodiment, the x and y vectors are solved separately. These x and y vectors are then paired to describe a single fiducial mark 64 or pixel in the image.

Figure 4:
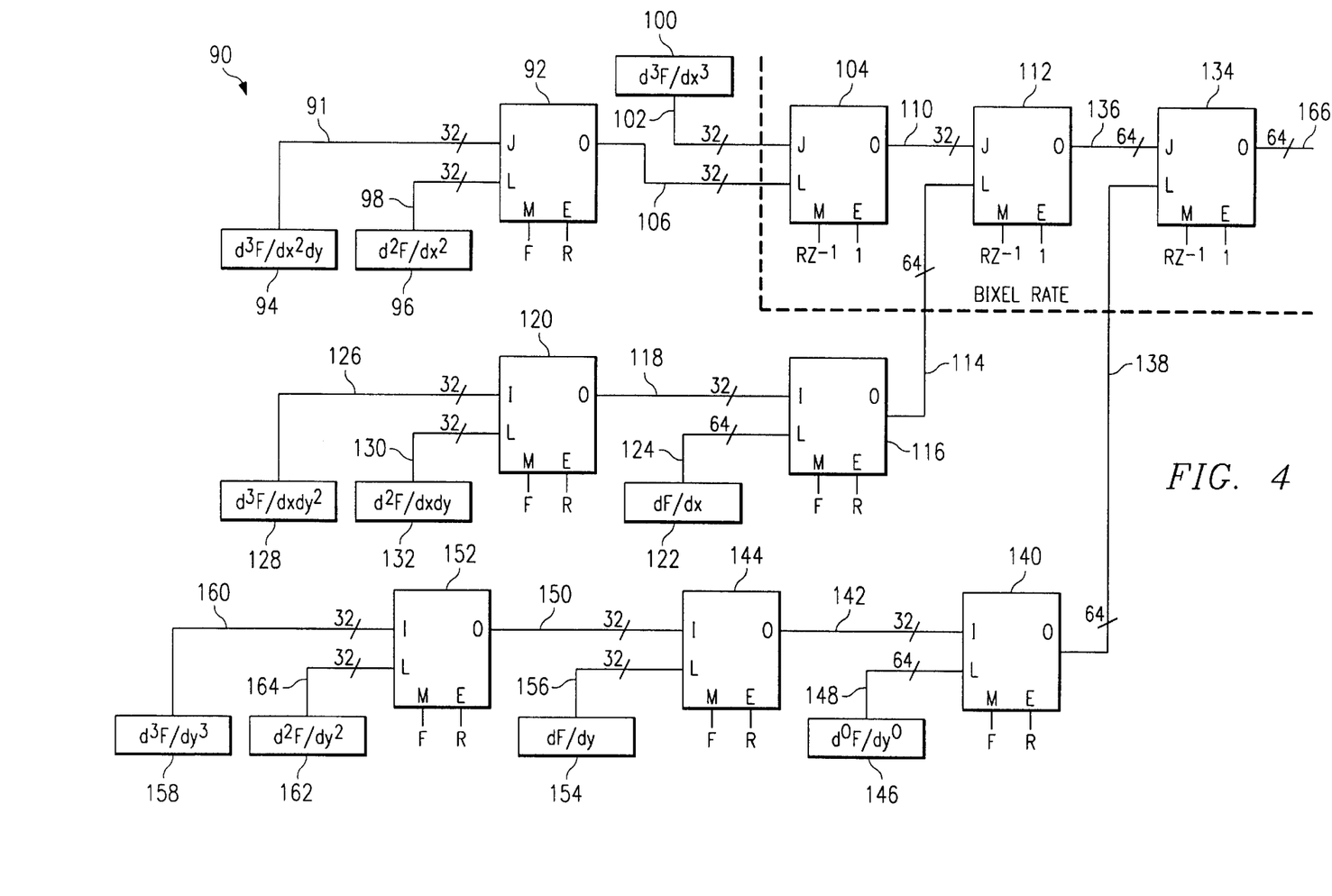
FIGS. 4 through 6 describe a trajectory engine for implementing one embodiment of the present invention.

After the coefficients for the vectors in x and y of C are derived, they are placed into the trajectory engine that FIG. 4 describes. The output from the trajectory engine permits selection of a pixel that represents the original pixel. This is done for each pixel in a given row. After completing a row, the process proceeds to a next row. This process continues until the entire image is complete.

The trajectory engine of FIG. 4 provides a simple way to implement a power series expansion, one pixel at a time. The resulting values are rounded to the nearest imager pixel. The value of the particular pixel is placed into an output array for thresholding (e.g., determining whether the original pixel was a one or a zero). The thresholding techniques that the present embodiment uses is known as adaptive thresholding. Essentially, the thresholding process maintains the threshold value based on previous values of ones and zeros that were determined. As a result, the present embodiment may respond to changes in intensity that occur across the image. The trajectory engine may be implemented in software or hardware, or a combination of hardware and software. For explanation purposes, however, the following discussion discusses the trajectory engine in terms of a digital integrator circuit topography.

FIG. 4 shows a schematic diagram of projectory engine 90 for deriving a power series expansion for each pixel. Trajectory engine 90 includes third-order stage 92 that receives an input along 32-bit line 91 of $d^3F/dx^2dy$ input 94 and a $d^2F/dx^2$ input 96 over 32-bit line 98. The $d^3F/dx^3$ input 100 goes via 32-bit line 102 to second-order stage 104. Output from third-order stage 92 travels to second-order stage 104 on 32-bit line 106. Output from second-order stage 104 travels via 32-bit line 110 to intermediate stage 112. Intermediate stage 112 also receives, via 64-bit line 114 output from second-order stage 116. Second-order stage 116 receives an input via 32-bit line 118 from third-order stage 120, as well as dF/dx input 122 from 64-bit line 124. The output from third-order stage 120 results from the 32-bit line 126 input from $d^3F/dxdy^2$ input 128 and signals on 32-bit line 130 from $d^2F/dxdy$ input 132. Output from intermediate stage 112 goes to first-order stage 134 along 64-bit line 136. This combines with the 64-bit line 138 output from intermediate stage 140. Intermediate stage 140 receives on 32-bit line 142 a signal from second-order stage 144 as well as the dF/dy input 146 on 64-bit line 148. The output from second-order stage 144 is in response to the signals on 32-bit line 150 of third-order stage 152 and dF/dy input 154 on 32-bit line 156. Third-order stage 152 receives the $d^3/dy^3$ input 158 along 32-bit line 160 and a $d^2F/dy^2$ input 162 on 32-bit line 164. As a result of the staged input from intermediate stages 112 and 140, first-order stage 134 provides a 64-bit output on 64-bit line 166. The result is a set of values that may be rounded to the nearest integer for each image pixel. Each pixel value may be placed into an output array of thresholding.

Trajectory engine 90 also includes a bixel clock region that operates in response to bixel clock signals. The bixel clock signal is a clock signal that appears at the same rate that a pixel is being output via output line 166 to the image plane. For every pixel in the original or object, there is one clock signal. At the instance of a rising clock signal, the output of trajectory engine 90 is determined to provide the location that most-accurately determines where that image fell on the associated pixel.

Figure 5:
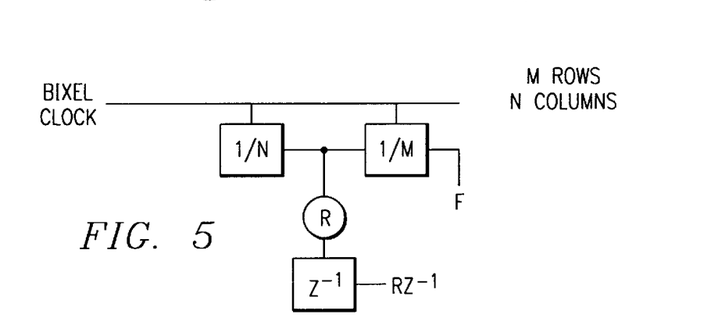
Figure 6:
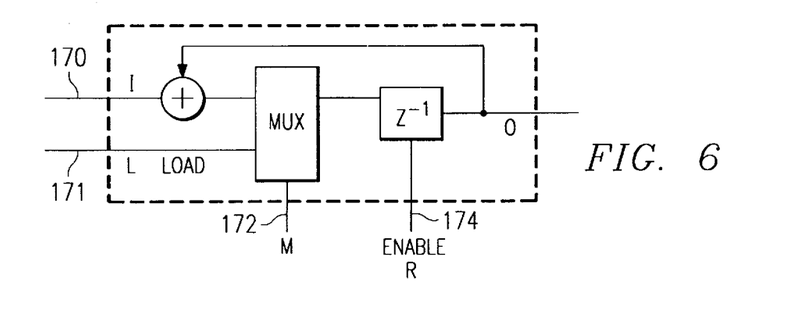

Referring to FIGS. 5 and 6, each stage in trajectory engine 90, for example third-order stage 92 of FIG. 4, is a multiplexer that selects between an initial value that is loaded at a certain time or an increment value that is again added to the accumulated value at another time. In trajectory engine 90, the I point 170 appearing at each stage refers to an increment value that gets added to the current value in the integrator. The L point 171 refers to the data that is loaded in each stage. The M point 172 refers to the either 0 or 1 single bit. The ENABLE R point 174 refers to the enable bit for a particular stage which operates a latch. In FIG. 4, the 1/M notation means that, after M bixel clocks, an ENABLE R clock occurs. This shows that there are M pixels per row. Likewise, the 1/N notation indicates that after N bixel clocks an ENABLE R clocks indicating that all rows are complete. There are N rows in the whole system. After completing all rows, a frame is complete. The notation $Z^{-1}$ is a standard notation for an accumulator which means a 1 clock delay.

One attractive aspect of the present embodiment of trajectory engine 90 is the use of binary fractional notation. Using binary fractional notation permits accumulating fractional position information in the last stage which is not directly used to select a pixel and which is fed back in an accumulation operation. The fractional information may be accurately determined and accounted for at initialization.

Trajectory engine 90 is initialized by the coefficient values for the upper left pixel in the image plane. These coefficients are entered into the integrator stages of the trajectory engine. That is, trajectory engine 90 selects an i and j in object plane 60 and determines where the pixel corresponding to the i and j in the object plane falls in the image plane for that pixel. Two trajectory engines 90 can run in parallel; one for the x location of the target bixel and one for the y location. Equation (1) may then be used to derive a value of x and a value of y. Trajectory engine 90 directs operations exactly to the pixel of interest in the image plane. The value is then entered into an intermediate output array at output 166.

After operation of trajectory engine 90, the thresholding function of the present embodiment determines whether the image pixel in the interim array value falls above or below some predetermined value that would indicate that its value should be zero or one. In the present embodiment, on the other hand, if the value is 128 (i.e., at the halfway point), the thresholding algorithm determines to be 0 or 1 based on a predetermined definitional step in trajectory engine 90 placed into a final output array.

The result of these stages is an image plane pixel location in the form of an integer value from zero to n (where n is the number of pixels). There is a particular coefficient that relates to the change in magnification or distortion of the image. The change in magnification or distortion may be viewed as a form of acceleration. With this concept in mind, a set of coefficients may be generated that indirectly determines the initial value for the particular row of the solution matrix. The cell may be considered to be a value of the change in magnification with respect to the change in a particular column. This change in magnification may be considered a velocity. The result is a position with the coordinates. In the present embodiment of trajectory engine 90, the value of the acceleration changes with respect to position at the upper left corner of the image. The subsequent rows in the image require modification of this value by further trajectory engine-type operations. All of this information appropriately maps back to Equation (1).

Note that although some coefficient terms in vector C do not actually reflect concepts such as magnification, the coefficients essentially plug into the various stages of trajectory engine 90 as initial values. It should also be noted that in practicing the present invention, the coefficients of the solution matrix are used with a slight modification. The modification takes into consideration a time delay that occurs at each stage of trajectory engine 90. For example, in describing and solving for the coefficients, the present method uses, instead of a $j^2$ term, a $j \cdot (j-1)$ term for the integrator stages. Likewise, for a $j^3$ term, the method uses $j \cdot (j-1) \cdot (j-2)$. This reflects the fact that trajectory engine 90 exists as a pipeline of stages with time delays in each stage. Hence, the value of $(j-1)$ is actually the value that exists prior to the current value for the j variable. Using the time delayed parameters, however, permits solving the coefficients in such a manner that they may be directly inserted into trajectory engine 90.

In summary, the present invention provides a method and system for compensating for geometric distortion of an image that includes a plurality of data pixels in an image plane. The data pixels represent an object viewed as a plurality of object pixels in an object plane. The plurality of object pixels comprises a plurality of fiducial marks. The method includes the steps of deriving a solution matrix from location coordinates of the plurality of fiducial marks in the object plane. The solution matrix includes a plurality of intermediate elements for predicting the location of the object pixels in the image plane. The method includes the step of acquiring the image in the image plane. From the image plane data, a next step is to determine a plurality of image plane fiducial locations in the image plane. Each of the image plane fiducial locations associate with the location of one of the plurality of fiducial marks in the object plane. A further step is to calculate a plurality of mapping coefficients from the fiducial marks and the image plane fiducial locations. These mapping coefficients permit mapping the data pixels according to the distortion of the image plane fiducial locations relative to the location coordinates of the fiducial marks in the object plane. A further step is to determine the image plane location of the data pixels on the imager array using these mapping coefficients. The result of these steps is an image that is compensated for any type of geometric distortion, including pin cushion, barrel, and misregistration distortions.

Although the invention has been described in detail herein with reference to the illustrative embodiments, it is to be understood that this description is by way of example only and is not to be construed in a limiting sense. It is to be further understood, therefore, that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A method for compensating for geometric distortion of a holoraphic image, said holographic image comprising a plurality of data pixels in an image plane representing an object viewed as a plurality of object pixels in a holographic object plane, said plurality of object pixels comprising a plurality of nominal fiducials, the method comprising the steps of:

deriving a solution matrix from location coordinates of said plurality of nominal fiducials in the holographic object plane, said solution matrix comprising a plurality of fiducial coefficients for predicting the location of the data pixels in the holographic image;

acquiring the image in the image plane;

determining a plurality of image plane fiducial locations in the image plane each associated with the location of one of said plurality of nominal fiducials;

calculating a plurality of mapping coefficients from said fiducial coefficients in said solution matrix and said image plane fiducial locations for mapping said data pixels according to the distortion of said image plane fiducial locations relative to the location coordinates of said nominal fiducials; and determining the image plane location of the data pixels using said solution matrix and said mapping coefficients.

2. The method of claim 1, wherein said distortion is a pin cushion distortion and further wherein said calculating step comprises the step of calculating a plurality of mapping coefficients from said fiducial coefficients in said solution matrix and said image plane fiducial locations for mapping said data pixels according to the pin cushion distortion of said image plane fiducial locations relative to the location coordinates of said nominal fiducials.

3. The method of claim 1, wherein said distortion is a barrel distortion and further wherein said calculating step comprises the step of calculating a plurality of mapping coefficients from said fiducial coefficients in said solution matrix and said image plane fiducial locations for mapping said data pixels according to the barrel distortion of said image plane fiducial locations relative to the location coordinates of said nominal fiducials.

4. The method of claim 1, wherein said calculating step comprises the step of performing a set of matched filter search operations for locating a set of corner fiducials from the plurality of image plane fiducial locations.

5. A method for compensating for geometric distortion of an image, said image comprising a plurality of data pixels in an image plane representing an object viewed as a plurality of object pixels in an object plane, said plurality of object pixels comprising a plurality of nominal fiducials, the method comprising the steps of:

deriving a solution matrix from location coordinates of said plurality of nominal fiducials in the object plane, said solution matrix comprising a plurality of fiducial coefficients for predicting the location of the data pixels in the image plane;

acquiring the image in the image plane;

determining a plurality of image plane fiducial locations in the image plane each associated with the location of one of said plurality of nominal fiducials;

calculating a plurality of mapping coefficients from said fiducial coefficients in said solution matrix and said image plane fiducial locations for mapping said data pixels according to the distortion of said image plane fiducial locations relative to the location coordinates of said nominal fiducials; and determining the image plane location of the data pixels using said solution matrix and said mapping coefficients;

said calculating step comprising the step of performing a set of matched filter search operations for locating a set of corner fiducials from the plurality of image plane fiducial locations and a plurality of centroid calculations for determining the location of the remainder of said plurality of image plane fiducial locations.

6. A method for compensating for geometric distortion of an image, said image comprising a plurality of data pixels in an image plane representing an object viewed as a plurality of object pixels in an object plane, said plurality of object pixels comprising a plurality of nominal fiducials, the method comprising the steps of:

deriving a solution matrix from location coordinates of said plurality of nominal fiducials in the object plane, said solution matrix comprising a plurality of fiducial coefficients for predicting the location of the data pixels in the image plane;

acquiring the image in the image plane;

determining a plurality of image plane fiducial locations in the image plane each associated with the location of one of said plurality of nominal fiducials;

calculating a plurality of mapping coefficients from said fiducial coefficients in said solution matrix and said image plane fiducial locations for mapping said data pixels according to the distortion of said image plane fiducial locations relative to the location coordinates of said nominal fiducials; and determining the image plane location of the data pixels using said solution matrix and said mapping coefficients;

said image plane location determining step further comprising the step of deriving an image plane location for data pixels using a trajectory engine for each pixel in the image plane.

7. A system for compensating for geometric distortion of a holographic image comprising a plurality of data pixels representing an object viewed as a plurality of object pixels in a holographic object plane with selected ones of said plurality of object pixels comprising a plurality of nominal fiducial marks, said system comprising:

a solution matrix formed from location coordinates of the plurality of nominal fiducial marks in the holographic object plane and comprising a plurality of fiducial coefficients for predicting the location of the data pixels in the holographic image;

image circuitry for acquiring the image in the image plane and determining a plurality of image plane fiducial locations in the image plane, said image plane fiducial locations associated with the location of said fiducial marks in the object plane; and mapping circuitry for deriving a plurality of mapping coefficients from the fiducial marks and the image plane fiducial locations according to the distortion of the image plane fiducial locations relative to the location coordinates of the fiducial marks in the object plane.

8. The system of claim 7, wherein said distortion is a pin cushion distortion and further wherein said mapping circuitry comprises circuitry for calculating a plurality of mapping coefficients from said fiducial coefficients in said solution matrix and said image plane fiducial locations, for mapping said data pixels according to the pin cushion distortion of said image plane fiducial locations relative to the location coordinates of said nominal fiducials.

9. The system of claim 7, wherein said distortion is a barrel distortion and further wherein said mapping circuitry further comprises circuitry for calculating from said fiducial coefficients in said solution matrix and said image plane fiducial locations for mapping said data pixels according to the barrel distortion of said image plane fiducial locations relative to the location coordinates of said nominal fiducials.

10. The system of claim 7, wherein said mapping circuitry further comprises circuitry for performing a set of matched filter search operations for locating a set of corner fiducials from the plurality of image plane fiducial locations.

11. A system for compensating for geometric distortion of an image comprising a plurality of data pixels representing an object viewed as a plurality of object pixels in an object plane with selected ones of said plurality of object pixels comprising a plurality of fiducial marks, said system comprising:

a solution matrix formed from location coordinates of the plurality of fiducial marks in the object plane and comprising a plurality of intermediate elements for predicting the location of the object pixels in the image plane;

image circuitry for acquiring the image in the image plane and determining a plurality of image plane fiducial locations in the image plane, said image plane fiducial locations associated with the location of said fiducial marks in the object plane; and mapping circuitry for deriving a plurality of mapping coefficients from the fiducial marks and the image plane fiducial locations according to the distortion of the image plane fiducial locations relative to the location coordinates of the fiducial marks in the object plane, said mapping circuitry further comprising circuitry for performing a set of matched filter search operations for locating a set of corner fiducials from the plurality of image plane fiducial locations and a plurality of centroid calculations for determining the location of the remainder of said plurality of image plane fiducial locations.

12. A system for compensating for geometric distortion of an image comprising a plurality of data pixels representing an object viewed as a plurality of object pixels in an object plane with selected ones of said plurality of object pixels comprising a plurality of fiducial marks, said system comprising:

a solution matrix formed from location coordinates of the plurality of fiducial marks in the object plane and comprising a plurality of intermediate elements for predicting the location of the object pixels in the image plane;

image circuitry for acquiring the image in the image plane and determining a plurality of image plane fiducial locations in the image plane, said image plane fiducial locations associated with the location of said fiducial marks in the object plane said image circuitry comprising a trajectory engine for deriving an image plane location for data pixels; and mapping circuitry for deriving a plurality of mapping coefficients from the fiducial marks and the image plane fiducial locations according to the distortion of the image plane fiducial locations relative to the location coordinates of the fiducial marks in the object plane.

13. A holographic system having the ability to compensate for geometric distortion of an image comprising a plurality of data pixels representing an object viewed as a plurality of object pixels in an object plane with selected ones of said plurality of object pixels comprising a plurality of fiducial marks, said holographic system comprising:

holographic imaging circuitry of generating a holographic image of an object viewed as a plurality of object pixels in an object plane with selected ones of said plurality of object pixels comprising a plurality of fiducial marks;

image processing circuitry for displaying on a holographic image plane comprising a plurality of image plane data pixels; and image distortion compensating circuitry for compensating for geometric distortion of the holographic image, comprising:

a solution matrix formed from location coordinates of the plurality of fiducial marks in the object plane and comprising a plurality of intermediate elements for predicting the location of the object pixels in the image plane;

image circuitry for acquiring the image in the image plane and determining a plurality of image plane fiducial locations in the image plane, said image plane fiducial locations associated with the location of said fiducial marks in the object plane; and mapping circuitry for deriving a plurality of mapping coefficients from the fiducial marks and the image plane fiducial locations according to the distortion of the image plane fiducial locations relative to the location coordinates of the fiducial marks in the object plane.

14. The system of claim 13, wherein said distortion is a pin cushion distortion and further wherein said mapping circuitry comprises circuitry for calculating a plurality of mapping coefficients from said fiducial coefficients in said solution matrix and said image plane fiducial locations, for mapping said data pixels according to the pin cushion distortion of said image plane fiducial locations relative to the location coordinates of said nominal fiducials.

15. The system of claim 13, wherein said distortion is a barrel distortion and further wherein said mapping circuitry further comprises circuitry for calculating a plurality of mapping coefficients from said fiducial coefficients in said solution matrix and said image plane fiducial locations for mapping said data pixels according to the barrel distortion of said image plane fiducial locations relative to the location coordinates of said nominal fiducials.

16. The system of claim 13, wherein said mapping circuitry further comprises circuitry for performing a set of matched filter search operations for locating a set of corner fiducials from the plurality of image plane fiducial locations.

17. The system of claim 13, wherein said mapping circuitry further comprises circuitry for performing a set of matched filter search operations for locating a set of corner fiducials from the plurality of image plane fiducial locations and a plurality of centroid calculations for determining the location of the remainder of said plurality of image plane fiducial locations.

18. The system of claim 13, wherein said image circuitry further comprises a trajectory engine for deriving an image plane location for data pixels.

19. The system of claim 1, wherein said distortion is a lower order offset distortion and further wherein said calculating step comprises the step of calculating a plurality of mapping coefficients from said fiducial coefficients in said solution matrix and said image plane fiducial locations for mapping said data pixels according to the lower order offset distortion of said image plane fiducial locations relative to the location coordinates of said nominal fiducials.

20. The method of claim 1, wherein said distortion is rotation distortion and further wherein said calculating step comprises the step of calculating a plurality of mapping coefficients from said fiducial coefficients in said solution matrix and said image plane fiducial locations for mapping said data pixels according to the rotation distortion of said image plane fiducial locations relative to the location coordinates of said nominal fiducials.

21. The method of claim 1, wherein said distortion is scaling distortion and further wherein said calculating step comprises the step of calculating a plurality of mapping coefficients from said fiducial coefficients in said solution matrix and said image plane fiducial locations for mapping said data pixels according to the scaling distortion of said image plane fiducial locations relative to the location coordinates of said nominal fiducials.

22. The system of claim 7, wherein said distortion is lower order offset distortion and further wherein said mapping circuitry further comprises circuitry for calculating a plurality of mapping coefficients from said fiducial coefficients in said solution matrix and said image plane fiducial locations for mapping said data pixels according to the lower order offset distortion of said image plane fiducial locations relative to the location coordinates of said nominal fiducials.

23. The system of claim 7, wherein said distortion is rotation distortion and further wherein said mapping circuitry further comprises circuitry for calculating a plurality of mapping coefficients from said fiducial coefficients in said solution matrix and said image plane fiducial locations for mapping said data pixels according to the rotation distortion of said image plane fiducial locations relative to the location coordinates of said nominal fiducials.

24. The system of claim 7, wherein said distortion is scaling distortion and further wherein said mapping circuitry further comprises circuitry for calculating a plurality of mapping coefficients from said fiducial coefficients in said solution matrix and said image plane fiducial locations for mapping said data pixels according to the scaling distortion of said image plane fiducial locations relative to the location coordinates of said nominal fiducials.

25. The system of claim 13, wherein said distortion is lower order offset distortion and further wherein said mapping circuitry further comprises circuitry for calculating a plurality of mapping coefficients from said fiducial coefficients in said solution matrix and said image plane fiducial locations for mapping said data pixels according to the lower order offset distortion of said image plane fiducial locations relative to the location coordinates of said nominal fiducials.

26. The system of claim 13, wherein said distortion is rotation distortion and further wherein said mapping circuitry further comprises circuitry for calculating a plurality of mapping coefficients from said fiducial coefficients in said solution matrix and said image plane fiducial locations for mapping said data pixels according to the rotation distortion of said image plane fiducial locations relative to the location coordinates of said nominal fiducials.

27. The system of claim 13, wherein said distortion is scaling distortion and further wherein said mapping circuitry further comprises circuitry for calculating a plurality of mapping coefficients from said fiducial coefficients in said solution matrix and said image plane fiducial locations for mapping said data pixels according to the scaling distortion of said image plane fiducial locations relative to the location coordinates of said nominal fiducials.

* * * * *